Sept. 24, 1968    G. R. O'NEIL ET AL    3,402,685
HIGH SPEED RECIPROCATING HILLDROP VALVE
Filed Jan. 17, 1966    2 Sheets-Sheet 2
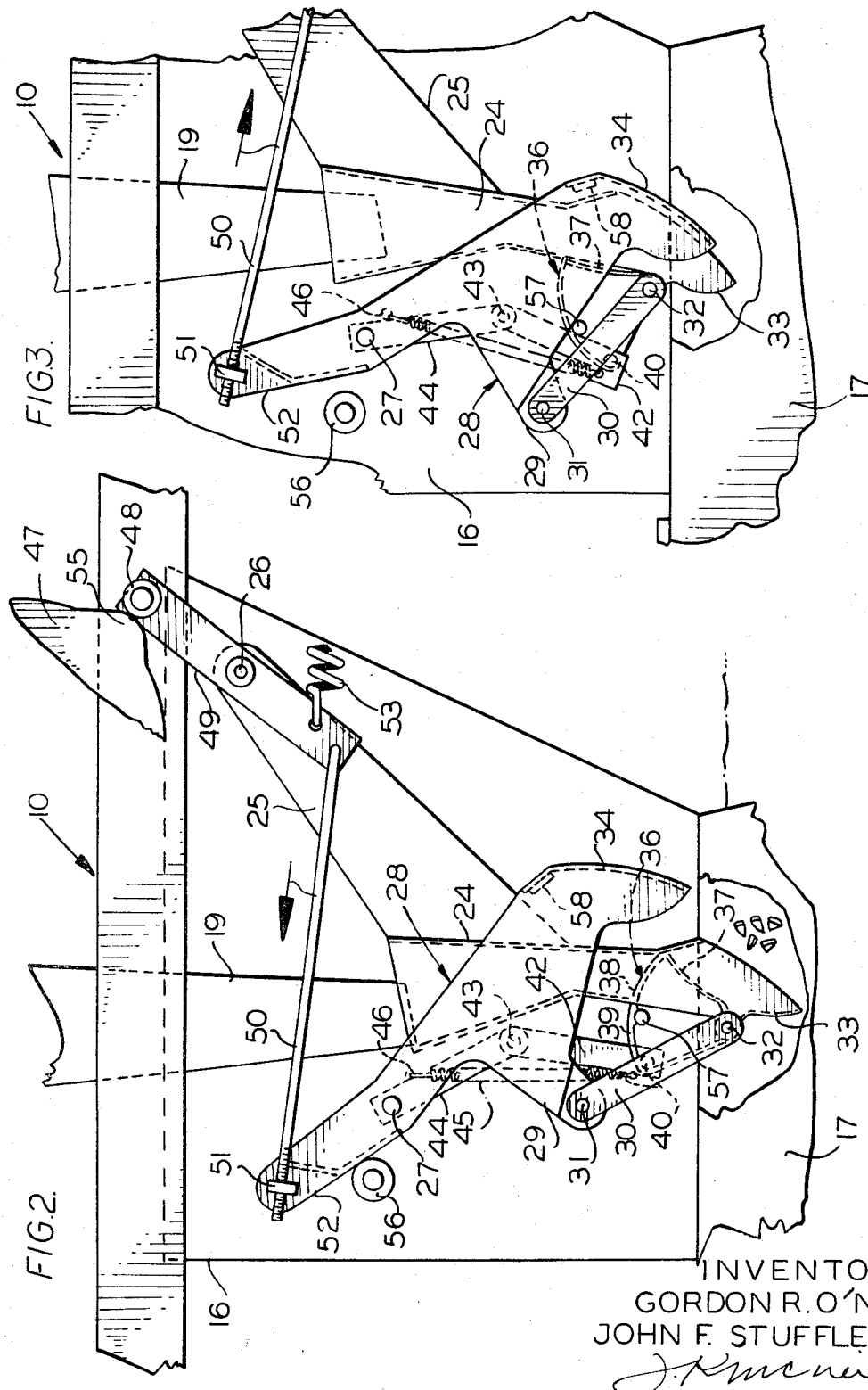
INVENTORS
GORDON R. O'NEIL
JOHN F. STUFFLEBEAM
ATT'Y United States Patent Office 3,402,685
Patented Sept. 24, 1968

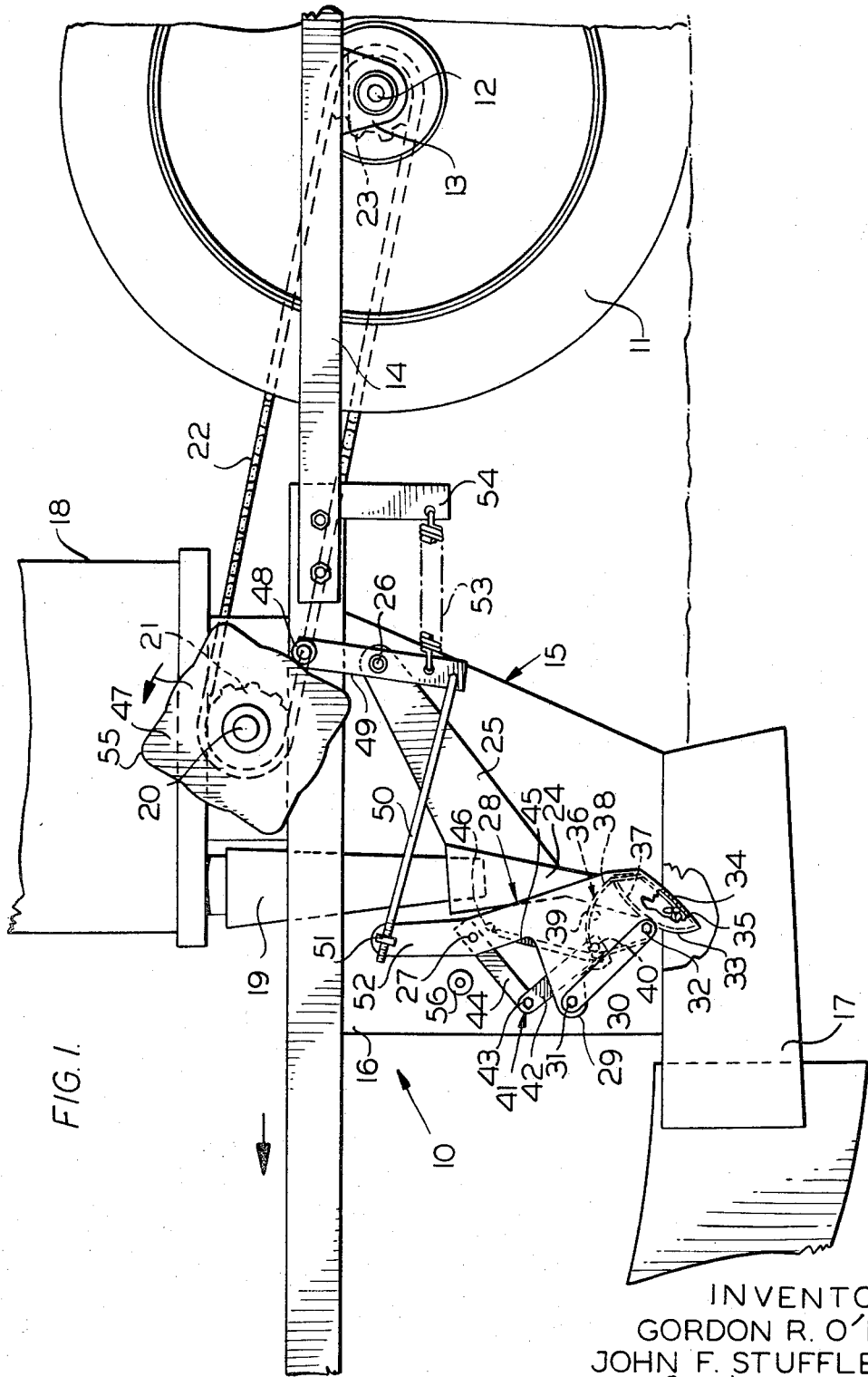

3,402,685
HIGH SPEED RECIPROCATING
HILLDROP VALVE
Gordon R. O'Neil, Westmont, and John F. Stufflebeam, Lockport, Ill., assignors to International Harvester Company, Chicago, Ill., a corporation of Delaware
Filed Jan. 17, 1966, Ser. No. 521,062
5 Claims. (Cl. 111—37)

ABSTRACT OF THE DISCLOSURE

A hilldrop planter wherein a valve arrests and groups seed discharged from a hopper and is reciprocated at high speed between positions for accumulating seed and ejecting the accumulated seed to the ground.

---

This invention relates to agricultural implements and particularly to planters. More specifically, the invention concerns planters of the hilldrop type wherein a plurality of seeds are deposited in hills at regular intervals as the planter travels over the ground.

An object of the invention is to provide improved seed control mechanism for a planter adapted to deposit seed in the ground in compact groupings.

Another object of the invention is to provide accumulating valve means at the outlet of a seed guide tube and novel precision means for feeding the seed thereto.

Other objects and advantages of the invention will become clear from the following detailed description when read in conjunction with the accompanying drawings, wherein:

FIGURE 1 is a view in side elevation, partly in section and with parts removed, of a planter unit having hilldrop mechanism incorporating the features of this invention and showing the seed accumulating valve mechanism in closed position prior to discharge of a hill of seed;

FIGURE 2 is an enlarged detail of a portion of the structure shown in FIGURE 1 with the accumulating valve in its open position at the moment of discharge of a hill of seed therefrom; and, FIGURE 3 is a view similar to FIGURE 2 showing the accumulating valve near the end of its closing cycle.

In the drawings the numeral 10 designates the supporting frame of a ground driven planter unit adapted to be propelled in the direction of the arrow shown in FIGURE 1 and supported at its rear end by a ground engaging wheel 11 mounted on an axle 12 carried by brackets 13 secured to laterally spaced frame extensions 14, only one of which is shown.

Also forming part of the frame 10 is a planter booth 15 comprising laterally spaced plates 16, only one of which is shown, and to the lower end of the boot is affixed a furrow opener 17.

A seed containing hopper 18 dispenses seed through a downspout 19 by any well known planter mechanism including a drive shaft 20 having a sprocket wheel 21 mounted thereon and connected by a chain 22 to another sprocket wheel 23 mounted on axle 12.

Seed from hopper 18 passing through downspout 19 is directed into a guide tube 24 having affixed thereto an arm 25 mounted at its end on a pivot pin 26 carried by boot 15 to accommodate swinging of the seed guide tube about a transverse axis.

Also mounted in the boot on a pivot pin 27 is a closure valve member 28 having an angled extension 29 to which a thrust link 30 is pivotally connected at 31. The other end of thrust link 30 is mounted on a pivot pin 32 carried by the cup-shaped lower end 33 of tube 24. The lower end 33 of the seed tube forms part of a seed discharge valving mechanism the other part of which is formed by the mating foot portion 34 of closure member 28.

The discharge valving mechanism 33, 34 is shown in its closed position in FIGURE 1, and before seed is discharged from tube 24 it is accumulated in a selected grouping, as indicated at 35 in FIGURE 1 between the lower end 33 of the tube and foot 34 of the closure member 28.

The free fall of seed from the hopper 18 to the bottom of the seed tube 24 is interrupted and delivery of a group of seed to the discharge outlet is interrupted and controlled by the provision of a retainer 36, generally triangular in shape and mounted for swinging movement on pivot pin 32. In the closed position of member 28 shown in FIGURE 1, retainer 36 is also closed, one curved side 37 thereof forming a part of the discharge valving mechanism 33, 34 to confine the seed prior to discharge. The uppermost side of retainer 36 is curved and is provided with an inner valve portion 38 received in tube 24 and serving to interrupt the seed falling from hopper 18.

The outside portion 39 of the retainer is provided with a pivot pin 40 which serves as the anchor for one end of an articulated or toggle link assembly 41 comprising a link 42 mounted on pin 40 and pivotally connected by a pin 43 with another link 44, the other end of which is mounted on pivot pin 27. Retainer 36 is biased to the closed position shown in FIGURE 1 and links 42 and 44 are biased to the overcenter position shown by a spring 45 anchored at one end to the lower end of link 42 and at its upper end to a pin 46 on the closure member 28.

To discharge the seed group 35 from the discharge outlet of the seed tube, closure member 28 is rocked counterclockwise from the position of FIGURE 1 to the position of FIGURE 2 by the provision of a generally square cam member 47 mounted on drive shaft 20 and engageable with a roller 48 carried on one arm of a lever 49 which is pivoted medially of its ends on the pin 26. The other end of the lever is connected by an adjustable rod 50 to a swivel 51 on an extension 52 of closure member 28, the swivel being threaded to receive the threaded end of the rod 50 for adjusting the effective length of the latter, to thereby regulate the extent of movement imparted to closure member 28. The closure member is biased to its closed position by the provision of a spring 53 anchored at one end to the lower end of lever 49 and at its other end to a bracket 54 affixed to the implement frame.

To swing closure member 28 to its open position lever 49 is rocked in a clockwise direction four times for each revolution of cam member 47 by engagement with one of the peaks 55 thereof. When roller 48 passes one of the peaks spring 53 is effective to return closure member 28 to its closed position.

As shown in FIGURE 2, when closure member 28 is fully opened, extension 52 thereof engages a stop 56 carried by boot 16. Counterclockwise swinging of closure 28 causes thrust link 30 to swing the lower end of tube 24 downwardly and rearwardly as shown in FIGURE 2 to facilitate the discharge of seed therefrom into the furrow formed by the furrow opener 17.

As the seed is discharged, another seed group is retained by member 36. To insure the proper functioning of retainer 36 the link assembly 41 functions as actuating means therefor and moves to a generally in-line or centered position as indicated in FIGURE 2, pivot pin 43 having moved somewhat beyond the center in the opposite direction.

The opening cycle of closure member 28 is complete when extension 52 engages stop 56. The closing cycle begins when peak 55 of cam 47 passes roller 48 and spring 53 takes effect. Engagement of pin 46 with upper link 44 exerts pressure on pivot pin 32 to swing retainer 36 to the open position of FIGURE 3. This movement of the retainer causes an abutment 57 carried thereby to press against lower link 42 and force the articulated linkage 41 over-center to the position of FIGURE 1 in the last portion of the closing cycle of the member 28. This forces return with a snap action of the retainer valve 36 to the closed position of FIGURE 1. The seed released by opening the retainer is caught in the pocket formed between valve elements 33 and 34, and discharge of the seed upon subsequent opening of closure 28 is assisted by the curved side 37 of retainer 36. Closing of the member 28 against the lower portion 33 of the seed tube is cushioned by the provision of a pad 58 at the lower rear end of member 34 and engageable with the lower rear portion of the seed tube.

It is believed that the construction and operation of the novel planter mechanism of this invention will be clearly understood from the foregoing description. It should likewise be understood that the invention has been described in its preferred embodiment and that modifications may be made therein without departing from the spirit of the invention or the scope of the appended claims.

What is claimed is:

1. In a planter, a frame, a seed hopper mounted on the frame, a generally vertical seed guide tube pivotally mounted on the frame having an upper seed receiving opening and a lower discharge outlet, a closure member pivotally mounted on the frame having a valve portion at its lower end, spring means connected between the frame and said closure member to bias the latter to a closed position with said valve portion in cooperative relation with said discharge outlet to accumulate seed, means on the frame for swinging the closure member through a valve open cycle with said valve portion removed from said outlet to accommodate discharge of seed therefrom, a retainer member pivotally mounted on said tube having a valve section engageable in its closed position with seed in the tube to interrupt its passage from the hopper to said outlet, actuating means responsive to the swinging of the closure member in a valve closing cycle for rocking said retainer member about its pivot to an open position to permit passage of seed to the discharge outlet, and a thrust link connecting said closure member to said tube for swinging the lower end of the tube about a transverse axis in response to the swinging of the closure member.

2. The invention set forth in claim 1, wherein said actuating means includes a pair of articulated links, one of which is connected to the retainer and the other to said closure member, said links being movable into a generally centered relation to hold the retainer closed when the closure member is swung in one direction to its open position.

3. The invention set forth in claim 2, wherein abutment means carried by the retainer operatively engages one of said links and moves them overcenter in response to swinging said closure member in the other direction to return said retainer to its closed position.

4. The invention set forth in claim 3, wherein another spring means operatively connects the frame to said retainer to bias the latter to its closed position.

5. The invention set forth in claim 3, wherein said abutment means is effective at the end of the closing cycle of said closure member to throw said articulated links overcenter and move said retainer with a snap action to its closed position.

References Cited

UNITED STATES PATENTS

| 2,340,163 | 1/1944 | White | 111—51 |
| 2,669,951 | 2/1954 | Erwin | 222—498 |
| 2,840,018 | 6/1958 | Smith et al. | 111—51 |

ABRAHAM G. STONE, *Primary Examiner.*

S. C. PELLEGRINO, *Assistant Examiner.*